United States Patent [19]
Monroe et al.

[11] Patent Number: 5,445,729
[45] Date of Patent: Aug. 29, 1995

[54] COUNTER TOP REVERSE OSMOSIS SYSTEM

[75] Inventors: Jerry B. Monroe, Peoria; Wayne T. Widenburg, Phoenix; Jon S. Ford, Phoenix; James A. Monroe, Phoenix, all of Ariz.

[73] Assignee: Premier Manufactured Systems, Inc., Phoenix, Ariz.

[21] Appl. No.: 132,786

[22] Filed: Oct. 7, 1993

[51] Int. Cl.⁶ .............................................. B01D 17/12
[52] U.S. Cl. ...................................... 210/86; 210/109; 210/137; 210/257.2; 210/258
[58] Field of Search .................. 210/116, 86, 109, 110, 210/134, 137, 192, 232, 257.2, 258, 259, 260, 295, 320, 335, 416.3, 248; 222/109

[56] References Cited

U.S. PATENT DOCUMENTS

| | | | |
|---|---|---|---|
| 3,550,782 | 12/1970 | Veloz | 210/257.2 |
| 3,849,305 | 11/1974 | Manjikian | 210/116 |
| 4,842,724 | 6/1989 | Bray et al. | 210/257.2 |
| 5,039,402 | 8/1991 | Himelstein | 210/258 |
| 5,043,066 | 8/1991 | Miller et al. | 210/257.2 |
| 5,069,782 | 12/1991 | Moyher et al. | 210/192 |
| 5,089,144 | 2/1992 | Ozkahyaoglu et al. | 210/192 |
| 5,203,803 | 4/1993 | Schoenmeyr | 210/416.3 |
| 5,256,279 | 10/1993 | Voznick et al. | 210/86 |

*Primary Examiner*—Joseph W. Drodge
*Attorney, Agent, or Firm*—William C. Fuess

[57] ABSTRACT

A reverse osmosis (RO) unit uses a membrane permitting operation at abnormally low water pressures, typically as low as 10 PSI. Because any requirement for a pump to boost inlet water pressure is obviated, the RO unit makes do with only one, small and compact, outlet pump. An optional single, or a dual-channel dual-pass, ultraviolet (UV) light source sterilizes filtered inlet, and/or the purified output, water flows. Purified water is stored at atmospheric pressure in a simple storage bag, and is dispensed on demand by force of the outlet pump. The entire RO unit—storage bag, pump, filters, UV sterilizer, membrane and all—is preferably entirely integrally packaged in a compact and aesthetically pleasing cylindrically-shaped housing. The RO unit so housed is suitably deployed on a household counter top while flow-connected to normal household plumbing—typically to the faucet and drain of a kitchen sink—and while electrically connected to normal household power. The RO unit is operative to purify water in the event of an emergency or power emergency on solar or battery power, and is even operative in the complete absence of electrical power, such as after an earthquake or other emergency, by manual disconnection or bypass of its inlet solenoid valve.

11 Claims, 4 Drawing Sheets

FIG. 4

COUNTER TOP REVERSE OSMOSIS SYSTEM

The present patent application is related to U.S. patent application Ser. No. 08/156,861 filed Nov. 19, 1993, a continuation of application Ser. No. 07/906,666 filed Jun. 30, 1992 now abandoned entitled WATER CONSERVING REVERSE OSMOSIS SYSTEM. The inventor of the related application is the same J. Monroe who is a co-inventor in the present application.

BACKGROUND OF THE INVENTION

1. Field of the Invention

The present invention generally concerns reverse osmosis systems for the purification of water, particularly in homes and businesses.

The present invention particularly concerns (i) a reverse osmosis system operational at a low inlet water pressure without using any pump so as increase this pressure in order that a higher pressure may appear across the osmotic membrane of the system, and (ii) the packaging of such a reverse osmosis system having no inlet water pump.

2. Description of the Prior Art

The purification of water by reverse osmosis is an established technology that is being increasingly used due to problems with the purity of water resulting from pollution and like causes. The increasing usage of reverse osmosis technology has resulted in the development and refinement of relatively small systems, producing tens to hundreds of gallons of purified water per day, that are economically and technically feasible for use in domestic and similar applications.

Water purification by reverse osmosis takes time and is therefore is unsuited for use on a direct as needed, or demand, basis. In order for a water purification reverse osmosis apparatus to be practical, the apparatus must operate until a predetermined quantity of pure water is produced, storing the purified water so produced for dispensing when a demand occurs. After stored purified water reserves are dispensed to a predetermined level the reverse osmosis apparatus will resume operation to replace the amount depleted.

2.1 Previous Storage of Purified Water in Reverse Osmosis Systems

One particular prior art reverse osmosis water purification and storage apparatus currently in common use employs a special diaphragm-type hydro-pneumatic storage tank in which the purified water produced by the process of reverse osmosis unit is stored. The special tank is provided with a diaphragm to divide it into (i) a water storage compartment and (ii) a pre-pressurized air compartment. Purified water from the reverse osmosis unit is directed into the water storage compartment of the tank. The stored purified water is subject to the pressure force of the compressed air through the diaphragm, and will flow under influence of this force through a plumbing line to any open outlet, usually a faucet.

The steel hydro-pneumatic storage tank and its diaphragm cost several tens of dollars U.S. (circa 1993). The tank is subject to corrosion both internally and externally. In certain tanks bacteria and algae are prone to grow in the pressurized air compartment. Although the pressurized air compartment is normally separated from the purified water by the diaphragm, the stored water can become quickly, unexpectedly, severely, and possibly undetectably contaminated (as well as poorly dispensable) if the diaphragm becomes ruptured, howsoever minutely.

A homeowner or other user normally never has an occasion to see the interior air compartment of some tanks—an area that can be biologically contaminated with algae and bacterial growths even when the tank is fully and correctly operational. However, if this area is ever observed by the owner/user of the reverse osmosis system, such as during system maintenance or repair, the experience can be exceedingly disconcerting to a non-professional.

Accordingly, it would be useful if there were to be some way of dispensing with the steel tank in a reverse osmosis system in order to (i) reduce costs, (ii) abate any system locations where biological contamination, such as may in event of failure contaminate the purified water, might accrue, and/or (iii) potentially permit greater "hands-on" interaction of a consumer/user of the system with the system storage reservoir for maintenance or repair with reduced, or eliminated, risks of contamination, improper or unsuccessful disassembly/re-assembly, or general revulsion at what the task reveals, and involves. It will later be seen that a steel storage tank is not required in the reverse osmosis system of the present invention. Moreover, what takes its place is clean, simple, safe, and not only eminently suitable for user/-consumer manipulation, but, indeed, is fully intended to be so manipulated by a consumer/user (under certain circumstances).

It is also known to store purified water produced by a reverse osmosis system in a reservoir having a strong external physical resemblance, and limited internal resemblance, to the counter top reverse osmosis system—which, of course, contains a complete reverse osmosis system and more than just a reservoir—of the present invention. Such a reservoir is offered as the Compact Water Storage System Model 801–000 from SHURflo, 12650 Westminster Avenue, Santa Ana, Calif. 92706-2100. In the SHURflo Compact Water Storage System purified water from an external, unassociated, reverse osmosis system is received at atmospheric pressure into a water storage bag, preferably of ether-polyurethane material, contained within a compact, cylindrically-shaped, non-metallic case. As will be seen, the counter top reverse osmosis system of the present invention also employs an non-pressurized flexible water storage bag within a non-metallic case, or housing—but such is not the basis of the present invention.

Additionally, water is evacuated from the storage bag in the SHURflo Compact Water Storage System by a miniature electric pump, also contained within the case, of a type that is also eminently suitable to perform, and which does perform, the same evacuation function in the counter top reverse osmosis system of the present invention. Finally, input to a full bag storage reservoir is shut off by a solenoid valve, and the electrical actuation of the pump to evacuate purified water from the bag water storage reservoir for purposes of dispensing, both transpire under the control of switches which, quite logically, sense the fill level of the bag reservoir and the dispensing requirement. The solenoid and switches are also within the case. The reverse osmosis system of the present invention will likewise be seen to sense the same bag fill level, and dispensing requirement, and for similar purposes. Moreover, because the entire reverse osmosis unit of the present invention is within a case, such solenoids and switches are as used are also within the case.

However, as will later be seen, the present invention concerns more than the storage, and demand dispensing, of purified water. The SHURflo Compact Water Storage System is specifically advertised, and sold, to be used with a reverse osmosis (RO) unit that is both (i) external to the storage system and its bag reservoir, and (ii) conventional insofar as an inlet pump will be used to boost inlet water pressure across the membrane of the RO unit. The Counter Top Reverse Osmosis System of the present invention will be seen to differ in both these characteristics. Moreover, there is no electrical feedback from the Compact Water Storage System to the external RO unit. If the bag reservoir of the compact water storage system becomes full then the excess purified water is ported back to the RO unit as inlet water, as wasteful process. The counter top reverse osmosis system of the present invention will prove, as suits its common packaging, to be highly integrated, with sensed conditions concerning the storage and the dispensing of purified water used to control the reverse osmosis process itself, as well as the storage of the purified water developed thereby.

2.2 Previous Osmotic Membranes in Reverse Osmosis Systems

In order for a reverse osmosis unit to function properly, there must be a differential pressure across the reverse osmosis membrane, also called the osmotic membrane, in the direction of fluid flow through the membrane. Accordingly, it is essential that any water pressure in the water storage compartment of the special tank of the above-described prior art apparatus should not be allowed to exceed the inlet water pressure. If it were to do so then the differential pressure across the reverse osmosis membrane will fall below a minimum value and the pure water production rate of the reverse osmosis unit, as well as the purity of any water produced, would fall below acceptable levels.

Moreover, a prior art osmotic membrane typically produces a large pressure drop and therefore requires a high differential pressure, typically on the order of 40+ PSI, to push water through the membrane. Because the inlet water pressure seen on one side of the membrane must be greater than the outlet pressure of the purified water, which is typically 20-40 PSI, by the amount of the differential pressure, the inlet water pressure should be maintained at 60-85 PSI. Some municipal water systems, especially including but not limited to water systems in underdeveloped countries, do not provide a water line pressure that is this high.

Accordingly, in many prior art reverse osmosis systems a pump is commonly interposed between the inlet water source and the osmotic membrane in order to increase the pressure of the inlet water to a predetermined operating level. Typically the suction side of the pump is connected directly to a water source. The pump and reverse osmosis unit together form a detachable unit. To obtain the high pressures necessary it is preferable to use a positive displacement pump. Available pumps have been designed with economy and efficiency in mind and thus commonly employ a DC electric motor operating at its most efficient speed, typically in the range from 1500 to 6000 RPM. Because it takes the same power to do a given amount of work whether the pump operates at a high or at a low voltage, the current needed to drive a low voltage motor is higher than the corresponding current for a high voltage motor. To minimize unnecessary power losses, low voltage motors are typically fitted with low resistance copper brushes. This type of pump with a low-voltage motor produces a flow rate greater than the flow through the membrane. Therefore an accumulator is typically attached in line to store the excess water produced by the pump under pressure so as to reduce the on-off cycling of the pump.

The pump turns on when the inlet pressure at the reverse osmosis unit drops below a predetermined level. The pump supplies water to the reverse unit and the accumulator until a predetermined upper pressure limit is reached, at which point the pump turns off. The accumulator then supplies the osmotic membrane with water until the inlet pressure to the reverse osmosis unit drops below a lower limit. Typical pumps have a flow rate that is ten times the flow rate through the osmotic membrane. Accordingly, the pump typically operates less than ten percent of the time. The constant starting of the pump is noisy and tends to reduce the life of the pump. Additionally, pressure switches must be incorporated to measure the water pressure on the output of the pump, and to start and stop the pump when respective lower and upper pressure limits are reached. The pressure switches sometimes have slow response times, and are subject to fatigue.

A pump and an accumulator for a household reverse osmosis system together typically cost about $140 U.S. (circa 1993). The pump and accumulator, together with the storage tank discussed in section 2.1 above, typically aggregate roughly 50% of the total cost of a household reverse osmosis system.

Accordingly, it would be usefully economical if there were to be some way of dispensing with the pump and/or the accumulator and/or the tank in a household reverse osmosis system. The present invention will be seen to still use a pump, but one that is considerably smaller, and less expensive, than heretofore. It will later be seen that no inlet accumulator is required in the reverse osmosis system of the present invention.

2.3 Previous Pumps in Reverse Osmosis Systems

One pump suitable that will be seen to suitably be used in the system of the present invention is of a relatively new design, and the subject of U.S. Pat. No. 5,203,803 to Ivar Schoenmeyr for a REVERSE OSMOSIS WATER PURIFIER BOOSTER PUMP SYSTEM. The Schoenmeyr reverse osmosis water purification system incorporates a high-torque low-speed motor to drive a pump. Unlike what will later be seen as regards the present invention, in the Schoenmeyr reverse osmosis water purification system the pump is, however, still used in its conventional position between the source of inlet water and the osmotic membrane. It operates there to continuously pump water from the water source to the osmotic membrane. Notably in the Schoenmeyr reverse osmosis water purification system, the low speed of the pump motor does, however, produce a low flow rate from the pump to the membrane that is roughly equal to the flow rate through the membrane. Accordingly, and beneficially, no accumulator is needed. The high torque capability of the motor insures that the motor doesn't stall while pumping the water at the high pressures needed to force the water at the high pressure needed to reliably force the water through the membrane.

The Schoenmeyr reverse osmosis system may, and normally does, have and use a conventional reservoir to store the purified water as it is pumped through the reverse osmosis unit. The fill status of the reservoir is monitored in order to control the turning of the pump motor on and off, and the associated filling of the reservoir to a predetermined level.

The pump motor may have its rectifier mounted internally to effectively shield any radio frequency noise generated, such as might cause interference to an electronic appliance such as a radio, television or computer. The high torque low voltage motor may use carbon brushes to minimize wear of the commutator. The system typically uses a transformer to convert a standard 110 v.a.c. electrical power source to a low and safe 24 v.a.c. for the motor. The transformer has a higher impedance than the motor, and thus acts as a current limiter in the event the motor stalls.

A pump connected to the motor is a positive displacement, diaphragm actuated, device with a wobble plate. The pump has an internal pressure relief valve operatively connected to the inlet of the pump housing. The relief valve opens when the output pressure of the pump reaches a predetermined level. The relief valve permits the high pressure water to flow back into the housing inlet, creating a flow loop from the inlet back to the water source. The relief valve provides pressure relief in the event the pressure in the system exceeds operating levels. The relief valve also permits the pump to run continuously, even if the flow rate of the pump exceeds the flow rate across the osmotic membrane.

The same pump may thus be used for reverse osmosis units of different types and sizes. Even if the flow rate across the osmotic membrane is lower than the flow rate of the pump, the pump can still run continuously without an accumulator to absorb the excess water. The relief valve is easily constructed from an existing valve plate of the pump. The relief valve is preferably constructed so that the pump produces an audible sound when the relief valve is opening, providing an indication of when the pump is in a bypass condition. The relief valve can also be constructed so that the valve opens and closes at different pressures, thereby preventing oscillation of the valve.

None of these features of the Schoenmeyr pump, and pump system, are required for the reverse osmosis system of the present invention, which will be seen to function with an extremely rudimentary, and small, pump. The Schoenmeyr pump does, however, show the manner of such interesting, and sophisticated, management of pumped fluid (water) volumes and pressures as may also be used, if desired, in the system of the present invention.

SUMMARY OF THE INVENTION

The present invention contemplates a reverse osmosis system that is possessed of (i) a osmotic membrane permitting operations at abnormally low water pressures (typically as low as 15 PSI), and (ii) a single small, simple and inexpensive pump that is located not at the inlet, but rather at the purified water outlet, of the osmotic membrane.

Partially because the low-pressure osmotic membrane obviates any requirement for an inlet pump to boost inlet water pressure in household applications, and partially because the outlet pump used to boost outlet pressure is small and compact, an entire reverse osmosis system in accordance with the present invention may be, and preferably is, completely self-contained in a compact, and aesthetically pleasing, housing. The housed reverse osmosis system is particularly intended for domestic use, and commonly sits on a counter top. It is flow-connected to normal household plumbing, typically to each of (i) the faucet, or water inlet valve, and (ii) the drain of a sink. It is electrically connected to a standard, 110 v.a.c., household power outlet. This special packaging of a reverse osmosis system is also contemplated by the present invention.

The present invention further contemplates a reverse osmosis system that is usable for indefinitely prolonged periods totally without electrical power, such as may occur after a natural disaster or other emergency. The present invention still further contemplates a reverse osmosis system that may be cleaned, and substantially maintained and even repaired, by only its owner/operator.

The present invention is preferably embodied in a counter top reverse osmosis unit for use in a fluid flow path between and among (i) an inlet source of pressurized water, (ii) an outlet drain for accepting at atmospheric pressure waste water that is produced by the reverse osmosis unit, and (iii) an outlet port for dispensing pressurized purified water that is produced by the reverse osmosis unit. The counter top reverse osmosis unit is housed in a housing suitably sized and shaped so as to sit upon a counter top. The housing has, presents and permits all necessary flow connections between elements of the reverse osmosis unit that is completely contained within the housing and each of (i) the inlet source, (ii) the outlet drain and (iii) the outlet port.

The inlet source of pressurized water is flow-connected through the housing to, at the first, a sediment filter that is located within the housing. The sediment filter serves to filter particulate matter from the pressurized inlet water in a conventional manner. The sediment filter is in turn optionally flow-connected to an optional ultraviolet light, also located within the housing. The optional ultraviolet light serves to sterilize, in a conventional manner by use of ultraviolet light radiation, the pressurized filtered inlet water received from the filter.

The flow of the pressurized filtered water, whether also sterilized by the optional ultraviolet light or not, proceeds in turn to yet another filter, normally a carbon filter. The double-filtered water is finally applied to one side of an osmotic membrane that still located within the housing. This mode and manner of the flow of unpurified source water, where no pump is used to increase the pressure of the water above its normal inlet pressure prior to its application to the osmotic membrane, is uncommon. A reverse osmosis unit so constructed would normally be limited to use only with sources of inlet water pressurized to 40 PSI and more. The system of the present invention is not so limited, and will operate reliably with sources of water pressurized to as little as 10 PSI. This means that the system of the present invention is directly usable with many existing worldwide sources of unpurified water that is pressurized to at least 10 PSI, including a great percentage of water sources that are pressurized to at least 10 PSI but less than 40 PSI.

An osmotic membrane of a special new type, called a "low-pressure" osmotic membrane, permits the attainment of this performance. A pump is indeed used in the preferred embodiment of the present invention. However, as will be seen, this pump is positioned on the purified water output from, and not the inlet water to, the osmotic membrane.

The low-pressure osmotic membrane serves to separate the pressurized water received from the filter into (i) but-very-slightly-pressurized waste water, and (ii) but-very-slightly-pressurized purified water. Both the waste water and purified water are "but very slightly pressurized" because almost all of the typically modest pressure of the inlet pressurized water (which must be pressurized to at least 10 PSI in any case) is dropped across the osmotic membrane. The "but very slightly pressurized" waste water is flow-connected through the housing to the outlet drain. So connected, disposal of the waste water presents no problem because, being at a pressure slightly higher than atmospheric pressure, it may readily be voided into an outlet drain that is at atmospheric pressure.

Consonant with the necessity of accumulating and storing purified water produced over a period of time, the low pressure osmotic membrane is further flow connected for delivery of its but-very-slightly-pressurized purified water output to a collapsible storage bag reservoir located within the housing. The bag reservoir receives and stores the purified water.

The bag reservoir is in turn flow-connected to a pump that is still located within the housing. The pump serves to pump the but-very-slightly-pressurized purified water received from the collapsible storage bag reservoir out the outlet port under an adequate pressure, typically greater than 5 PSI and more typically 8 PSI, for the dispensing thereof.

Although most of the components of the reverse osmosis system, other than its low pressure membrane, are fairly conventional, some distinctions from conventional reverse osmosis systems should be noted. First, each of the filter, the ultraviolet light, the reverse osmosis membrane, the collapsible storage bag and the pump (and, actually, still other items) are all located entirely within the housing. This very dense packaging is promoted by the dedication of roughly a one-half vertical section of a counter top housing, roughly in the shape of an upright cylinder, to a compartment for containing the storage bag reservoir and also, preferably, the pump. Meanwhile, most of the remaining components are located in the remaining half-cylinder.

The dense packaging is further promoted by the use of only one small pump, which is located in the flow of purified water only after the osmotic membrane. The use of but one small pump in this outlet position is made possible by the use of a membrane that operates satisfactorily at a very low differential pressure, typically at a pressure as low as 10 PSI.

The counter top reverse osmosis system incorporates still other features as suit its portability and compactness. Because the collapsible storage bag reservoir is of complimentary shape and size to the compartment (one-half of a cylinder) of the housing within which the bag is contained, and because the pressure of the purified water contents of the storage bag reservoir need not be monitored nor maintained in order to support dispensing (which is accomplished on demand through the pump), the pressure and/or fill conditions of the storage bag reservoir need not be, and are not, monitored by pressure sensors, nor by any kind of switch or sensor that is located inside the storage reservoir (the bag) as is conventional. Instead, only the fill condition of the bag reservoir is monitored, and this by switches, typically simple and inexpensive micro-switches, that are located outside the bag reservoir and between it and the interior of the housing.

Moreover, because the purified water contents of the bag reservoir are not under any appreciable pressure, and because there are no switches nor sensors located internally within the bag reservoir, the entire bag reservoir is easily unplugged for replacement, cleaning or substitution. The unplugged bag contains purified water, and is usable as a source of such. The bag has no components inside or outside, and is essentially no more expensive than other quality plastic bags used to contain wine or other liquid foodstuffs. The bag is durable, and immune to corrosion. It is much less expensive than a steel tank.

As still another aspect of the present invention, a reverse osmosis unit having a low-pressure osmotic membrane may be operated to purify water totally without electricity, or with only such minimal electrical power as may typically be derived from batteries, a photovoltaic array, or the like. The modest requisite 10+ PSI pressure for operation of the low pressure osmotic membrane may be developed in an approximate twenty foot (20') head of water in an elevated garden hose or the like or, alternatively, by use of a small solar-powered water pump. In the total absence of electrical power the water purified by the reverse osmosis unit cannot be dispensed under pressure. However, in the total absence of electrical power purified water may still readily be poured from the bag reservoir, or from any other atmospheric pressure container, in which it is accumulated. (The reverse osmosis unit also lacks ultraviolet light sterilization during any abnormal absence of electrical power, but this will not unduly interfere with the satisfactory purification of water from many sources.) The use of the reverse osmosis system of the present invention in a mode independent of any electricity supply from a power grid is particularly beneficial for obtaining pure water after earthquakes or other natural disasters.

These and other aspects and attributes of the invention will become increasingly clear upon reference to the following drawings and the attached specification.

DESCRIPTION OF THE PREFERRED EMBODIMENT

The following description is of the best mode presently contemplated for the carrying out of the invention. This description is made for the purpose of illustrating the general principles of the invention, and is not to be taken in a limiting sense. The scope of the invention is best determined by reference to the appended claims.

Figure 1:
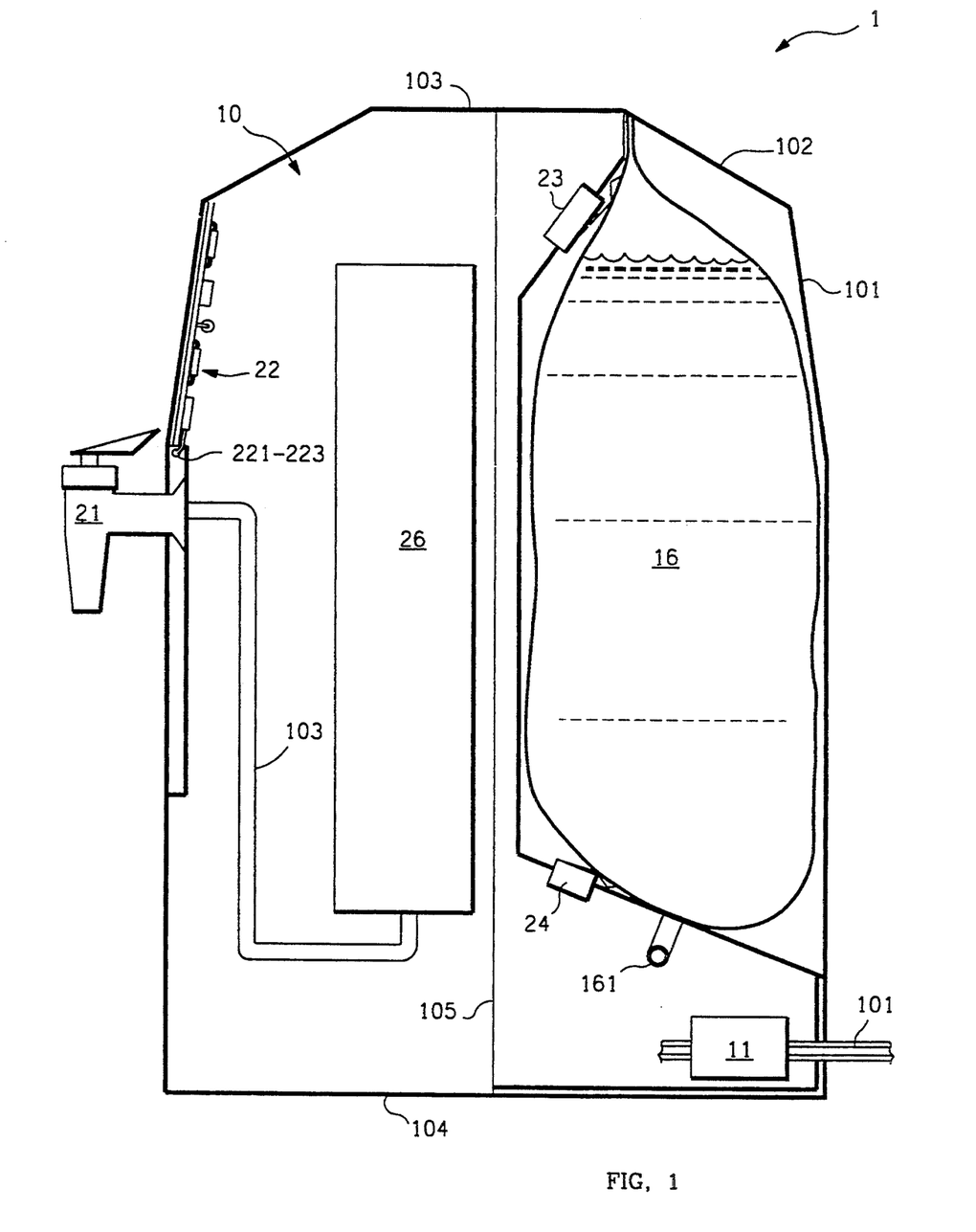
FIG. 1 is a diagrammatic representational cross-sectional side view of the preferred embodiment of a counter top reverse osmosis unit in accordance with the present invention, the side view prominently exposing a product purified water storage bag, a filter sub-assembly, and other components that are located entirely within a housing of the unit.
Figure 2:
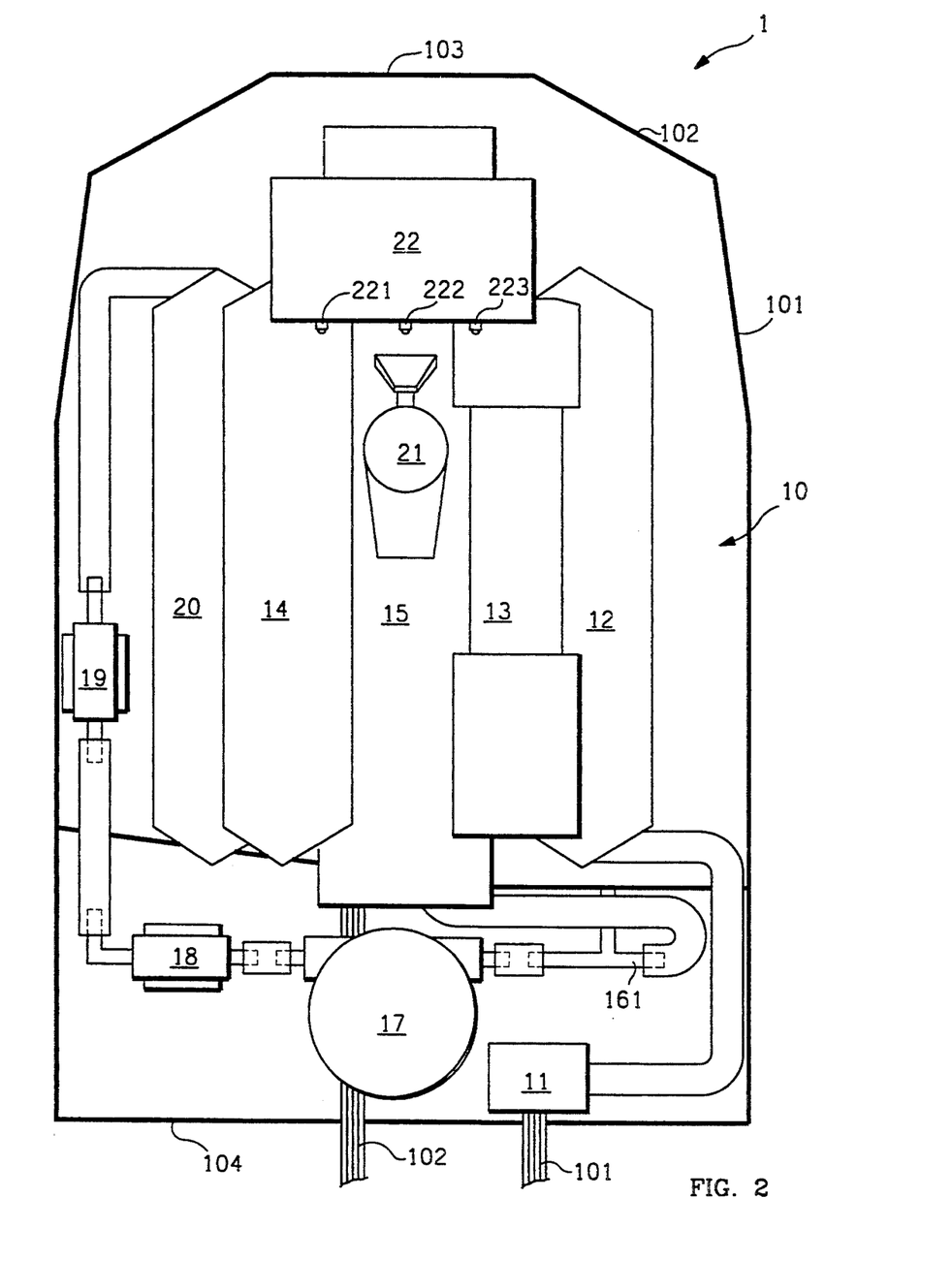
FIG. 2 is a diagrammatic representational cross-sectional front view of the preferred embodiment of a counter top reverse osmosis unit in accordance with the present invention, the front view prominently exposing certain components of the complete reverse osmosis system that are located entirely within the interior of the unit's housing.

1. The Preferred Embodiment of A Reverse Osmosis Unit in Accordance With the Present Invention is Entirely Contained Within a Housing A diagrammatic representational cross-sectional side view of the preferred embodiment of a counter top reverse osmosis unit 1 in accordance with the present invention is shown in FIG. 1. A housing, or case, 10 of the unit 1 is substantially in the shape of a cylinder, or, more precisely, a cylindrical segment. The cylindrical housing 10 has a substantially circular cross section perpendicular to its central axis, and a substantially rectangular cross-section along its central axis. The substantially rectangular cross-sectional views of the housing 10 shown in FIGS. 1 and 2 are taken vertically along the central axis of the housing.

The top regions of the cylindrical housing 10 are typically beveled by frustaconical surfaces 101 and 102. The very top surface 103 of the housing 10 is typically either flat or a very slightly convex, forming a small dome. Typical dimensions of the housing 10 are 15″ H×10″W×10″D. These compact dimensions—about the size of just the pressurized steel tank alone of a typical reverse osmosis system—make the unit 10 suitable for resting in the location of its base surface 104 a typical counter top (not shown).

The housing 10 is divided into two substantially equal compartments by a vertical partition 105 that completely bisects its volume from the base surface 104 to the top surface 103. The exterior shell of the housing 10 is also divided into two halves along the plane of its interior partition 105. The two shell halves are normally affixed to each other by screws, preferably by eight (8) self-tapping stainless steel screws (not shown) that are threaded into a like number of complimentary cavities (not shown) peripherally arrayed around the circumference (in the pline of partition 105) of the housing 10.

The housing 10 may alternatively be hinged for opening, typically by action of one or more—preferably two—interior or exterior—preferably interior—vertical axis, hinges (not shown) that are located on the housing 10 in line with a one vertical side of its central vertical partition 105. The diametrically opposite side of the housing 10 to that side upon which the hinge(s) is (are) located, which side is again in line with an extension of the housing's central vertical partition 105, normally has and presents an exterior latch (not shown) that serves to keep the halves of the housing 10 closed together. The housing 10 may be unlatched and opened along its hinge(s) for access to its interior components.

When the housing 10 is opened into its two halves that are defined by the vertical partition 105 then each half contains a certain respective portion of the counter top reverse osmosis unit 1. The two portions are (i) flow connected and (ii) electrically connected. As will soon be seen, the portions of the counter top reverse osmosis unit 1 that are present in each of the two halves of the housing have only minimal (i) flow, and (ii) electrical, connections between them. These connections may readily be made by routing necessary (i) fluid flow tubing and (ii) wires between the halves—in the region of the hinge(s) if the halves of the housing 10 are hinged—without undue complexity or interference to the opening of the housing 10.

The housing 10, and the entire counter top reverse osmosis unit 1, is normally made of lightweight, substantially nonmetallic, material. The housing 10 is typically made from molded plastic type ABS PP or PE. The internal water flow paths are plumbed with plastic tubing/pipe, typically FDA-approved types PP, PV or PU. The typical unfilled weight of the counter top reverse osmosis unit 10 is approximately ten pounds (10 lbs.). When fully filled with purified water its (operational) weight is approximately twenty-three pounds (23 lbs.). The modest weight of the counter top reverse osmosis unit 1—only about one-half ($\frac{1}{2}$) of the weight of a typical steel-tank residential reverse osmosis system—reduces shipping and handling costs, and makes the unit easy for a purchaser/user to transport, install, and temporarily move or relocate. The entire unit 1 is readily cleaned on its interior or exterior surfaces, and may readily be moved as proves necessary for cleaning of the counter top or other surface on which it rests.

All functional components of the counter top reverse osmosis unit 1 are entirely contained within the cylindrical housing 10. The unit 1 has and presents one electrical connection 122 (shown in FIG. 3) though its housing 10. The electrical connection 122 is via a standard waterproof a.c. line cord that connects by plugging through plug 123 (shown in FIG. 3) to a 110–115 v.a.c. line power (or, with changed taps to transformer 121 shown in FIG. 3, to a 220 v.a.c. or other line power). The internal power of the unit 1 is 24 v.d.c. Normal maximum power consumption is less than 1.3 watts even when the pump 7 (shown in FIGS. 2 and 3) is running.

The unit 1 has and presents three water flow-connections though its housing 10: one inlet connection 101 to a supply of pressurized water and two outlet connections 102 and 103. The outlet connection 102 is to a drain, typically of a sink, at atmospheric pressure. The outlet connection 103 delivers purified water under pressure, typically through a spigot 21 that may be affixed to the housing 10, as illustrated in FIGS. 1 and 2.

The inlet connection 101 preferably employs a quick disconnect fitting suitable for use in contact with potable water. The maximum pressure of the inlet water is typically eighty-five pounds per square inch (85 PSI). However, and notably, the pressure of the inlet water may be as low as ten pounds per square inch (10 PSI). Water delivery is typically up to one-half gallons per minute (0.50 gpm), dependent upon plumbing. The outlet connection 102 is preferably through a one quarter inch ($\frac{1}{4}$″) fitting. The delivery pressure through the outlet connection 103, or the spigot 21, is typically greater than five pounds per square inch (5 PSI), and is more commonly eight pounds per square inch (8 PSI), with a maximum delivery rate of typically one-half gallon per minute (0.50 gpm).

All water paths within the unit 1 (to be further shown in FIG. 2) are constructed of Food and Drug Administration (FDA) approved materials.

Continuing in the diagrammatic representations of FIGS. 1 and 2 showing the contents of the counter top reverse osmosis unit 1 in cross-section, the purified, or product, water storage bag reservoir 16 occupies about one-half (½) of the entire interior volume of housing 10. As previously discussed, the interior of housing 10 is divided into approximate halves by its vertical central partition 105. The central partition 105 not only separates the contents of the housing 10, and provides a cavity in the shape of vertically-standing half cylinder (a prism of the cross-section of a semi-circle), but also adds structural strength to the entire unit 10. The product water storage bag reservoir 16 is typically made of polyurethane. It has a plug-connected "T" joint 161 by which (purified) water flows in and out. It is normally located on that side, and in that cavity, of the housing 10 that is opposite to the spigot 21—reference FIG. 1.

Also located in the back cavity, but separate from the water storage bag reservoir 16, are the inlet water solenoid valve 11, the storage water upper level switch 23, the storage water lower level switch 24 and the pump 17. The electrical control of the inlet water solenoid valve 11 in response to the storage water upper level switch 23 and the storage water lower level switch 24 will be shown in the electrical schematic diagram of FIG. 4.

Except for the switches 23, 24 that serve to check the fill status of the water storage bag reservoir 16 (in a manner to be explained), the plumbing to the bag reservoir 16 through its "T" joint 161, and the inlet water solenoid valve 11, all other components of the counter top reverse osmosis unit 1 are located in the front cavity of the housing 10. The largest of these components include the inlet filter sub-assembly 26 (shown in FIG. 1), the osmotic membrane 15, and the optional ultraviolet (UV) sterilizer 13.

Figure 3:
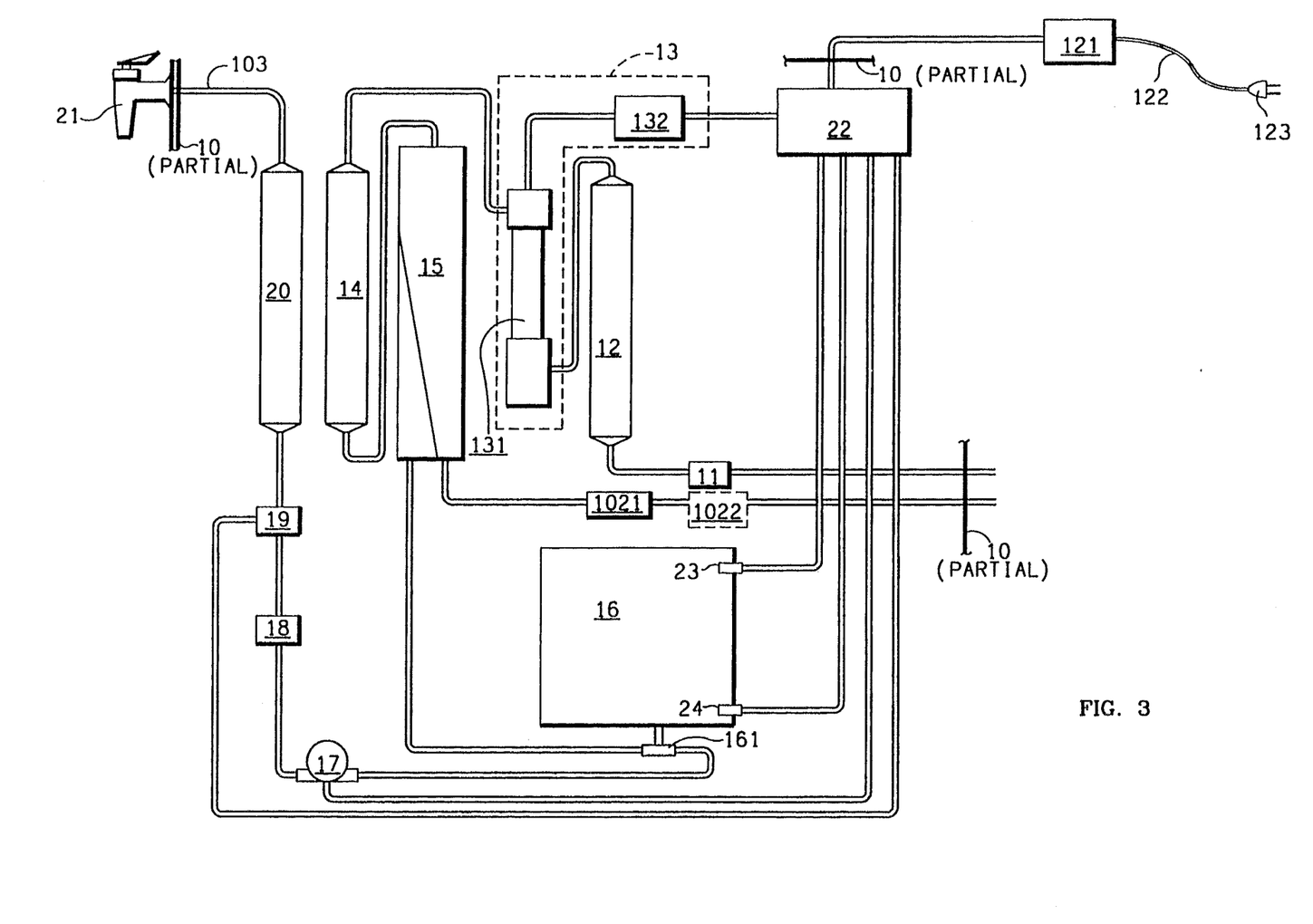
FIG. 3 is a schematic flow diagram of the preferred embodiment of a counter top reverse osmosis unit in accordance with the present invention previously seen in FIGS. 1 and 2.

The inlet filter sub-assembly 26 includes a first stage sediment filter 12, a second stage filter 14, and a fourth stage final carbon filter 20 (all shown in both FIGS. 2 and 3). (The osmotic membrane 15 itself is the third stage.) If the optional UV sterilizer 13 is included then it is preferably located between the first and second stage filters. A one-way flow valve 18 is located in the flow of purified water after the pump 17. The pressure of the purified water in the flow after the pump 17 and the one-way flow valve 18, and before the fourth stage carbon filter 20, is detected by pressure switch 19. The flow interconnections of these components are shown in greater detail in the schematic diagram of FIG. 3.

A control circuit board 22 is mounted to the inside of housing 10, as shown in FIGS. 1 and 2. Three light-emitting diodes 221-223 are mounted on a board of the control circuit 22 so as to be positioned against, and visible though, three corresponding small holes in the housing 10. The three LED's 221-223 serve to indicate the operational status of unit 1 in a manner to be explained in conjunction with the schematic diagram of FIG. 4.

For the purposes of FIGS. 1 and 2 it is sufficient simply to note that all necessary purification of the inlet water received via inlet connection 101 transpires entirely within the reverse osmosis unit 1 which is entirely contained within the (cylindrical) housing 10.

2. The Preferred Embodiment of A Reverse Osmosis Unit In Accordance With the Present Invention Uses a Low-Pressure Membrane, and One Small Pump Located in the Path of Purified Water Flow After the Membrane A schematic flow diagram of the preferred embodiment of a counter top reverse osmosis unit 1 in accordance with the present invention is shown in FIG. 3.

The unit 1 is entirely contained within the housing 10 previously seen in FIGS. 1 and 2. As previously explained, the unit 10 has and presents three flow-connections: one inlet connection 101 to a supply of pressurized water and two outlet connections 102 and 103. The outlet connection 102 is to a drain, typically of a sink, at atmospheric pressure. The outlet connection 103 delivers purified water under pressure, typically through a spigot 21 that is affixed to the housing 10 (as is best shown in FIG. 1).

Figure 4:
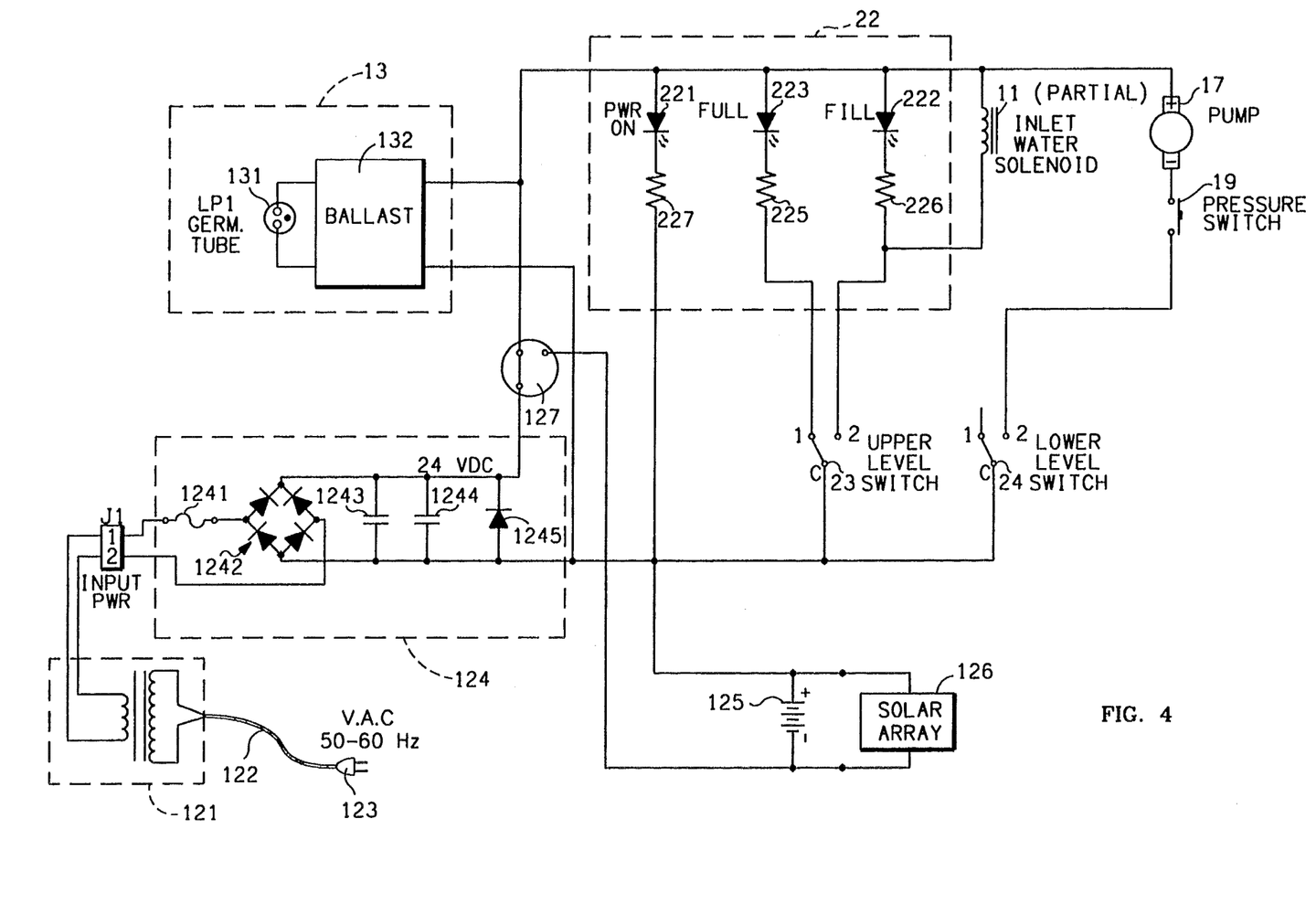
FIG. 4 is an electrical schematic diagram of the control circuit of the preferred embodiment of a counter top reverse osmosis unit in accordance with the present invention previously seen in FIGS. 1-3.

Unpurified pressurized supply water received via inlet connection 101 is routed through an inlet solenoid valve 11 under control of control circuit 22 (to be further seen in the schematic diagram of FIG. 4). Supply water passed through the inlet valve 11 is first filtered through the first stage sediment filter 12, and then through the second stage, carbon, filter 13.

The sediment filter 12 is typically a replaceable 10" polypropylene in-line sediment filter. The sediment filter 12 normally filters out particulate matter larger than 25 microns in the supply water, and thus removes sediment, dirt and rust.

The carbon filter 13 is typically a replaceable 10" Granular Activated Carbon (GAC) in-line filter. It serves to reduce objectionable tastes, odors, chlorine and/or organic chemicals in the filtered, but still unpurified, supply water.

The double-filtered pressurized supply water may then optionally be passed through an optional ultraviolet light, "UV", sterilizer 13. A replaceable ultraviolet light source, or "germ tube" 131, within the sterilizer 13 serves to kill microscopic biological organisms such as bacteria and algae that may still be present within the filtered water. The ballast 132 of the ultraviolet light sterilizer 13 is selectively energized under control of control circuit 22, which serves to switch the ultraviolet light sterilizer 13 on and off.

The filtered and sterilized pressurized water is received at, and purified by process of reverse osmosis through the osmotic membrane 15. The membrane 15 is commonly spoken of a "stage" in water purification. In the present, preferred, embodiment, it is the "third stage".

The preferred osmotic membrane 15 is of the Thin Film Composite (TFC) type. This TFC osmotic membrane 15 is a special new type available as part number TLPC from CHITCO, 301 Industrial Way #2 & 3, Fallbrook, Calif. 92028. The manufacturer CHITCO of the preferred osmotic membrane has recently recognized, but has not as of the date of this application publicly announced, that its new osmotic membrane is operative to effectively support reverse osmosis at a lower pressure differential than was heretofore previously deemed possible.

In particular, the TFC osmotic membrane 15 will reliably perform reverse osmosis when the pressure of the received (filtered and optionally sterilized) water across the osmotic membrane is as low as ten pounds per square inch (10 PSI). Because in the osmotic water purification system 1 of the present invention the purified water outlet of the osmotic membrane 15—the outlet to the purified water storage bag 16—is essentially at atmospheric pressure, this ten pounds per square inch (10 PSI) pressure is the operating pressure across osmotic membrane 15. Previous osmotic membranes typically required operating pressure above at least 40 PSI.

None of the inventors of the present invention are an inventor of the preferred new membrane 15, nor of the material from which it is constructed. Applicants herein disclose a new reverse osmosis system, packaged and plumbed in a new manner, that serves to make beneficial use of, among other things, the special properties of the new and preferred, TFC, osmotic membrane 15.

The reverse osmosis transpiring in the osmotic membrane 15 produces from the filtered and sterilized inlet water both (i) waste water (sometimes called concentrate, or blow down water) and (ii) purified water (sometimes called product water). The waste water is passed through outlet connection 102 to a drain. This flow connection 102 includes a flow restrictor 1021 and may optionally include a one-way check valve 1022 (shown in dashed line for being optional). The flow restrictor 1021 serves to ensure that a typically slight pressure differential is induced, and maintained, to create a back pressure to produce purified water between the outputs of the osmotic membrane 15 and the drain, which is at atmospheric pressure.

The pressure, at the outputs of the osmotic membrane 16 is, in the purified water line, sufficient to store purified water in the storage bag reservoir 16. The storage bag reservoir 16 resides in a cavity of complimentary shape and size inside the housing 10. As previously explained, the housing 10 is typically in the substantial shape of a vertically freestanding cylinder, as shown in FIGS. 1 and 2, and the cavity in which the storage bag reservoir 16 resides is roughly a one-half vertical section of the cylinder. The storage bag reservoir 16 is typically made from plastic or aluminized plastic, and may be either opaque, translucent or transparent.

The cavity external to the storage bag reservoir 16 is instrumented with two simple switches 23 and 24 (previously seen FIG. 1). Both the storage water upper level switch 23 and the storage water level lower switch 24 are electrically connected to the control circuit 22. The storage water upper level switch 23 is positioned at the top of the cavity between the interior of housing 10 and storage bag reservoir 16. An arm of the switch 23 contacts the exterior surface of the storage bag reservoir 16 and is depressed to a greater or lessor extent depending on the fill status of the storage bag reservoir 16. The switch 23 is normally enabled by a switch closure to conduct a signal only when, and if, the storage bag 16 reservoir is completely full.

Similarly, the storage water lower level switch 24 is positioned near the bottom of the cavity between the interior of housing 10 and storage bag reservoir 16. An arm of the switch 24 contacts the exterior surface of the storage bag reservoir 16 and is depressed to a greater or lessor extent depending on the fill status of the storage bag reservoir 16. The switch 24 is normally enabled to open, and to interrupt the conduct of a signal, only upon such times as the storage bag reservoir 16 is empty or nearly empty.

The storage bag reservoir 16 is physically connected to the reverse osmosis unit 1 only by the pluggable thru-fitting 161. The storage bag 16 reservoir may readily be unplugged, whether full or empty, for purposes of replacement or of withdrawal of a full bag of purified water.

The purified water stored in the storage bag reservoir 16 is normally withdrawn under pumping force of electric pump 17.

The purified water flowing under pressure force of pump 17 may optionally flow through another ultraviolet light sterilizer (not shown). This optional, second sterilizer, need not be a separate from the ultraviolet light sterilizer 13 but can, instead, be implemented as a second, minor and separate, flow path through and section of the existing ultraviolet sterilizer 13. (An optional flow path to support this optional use of a modified ultraviolet sterilizer 13 is not shown in FIG. 3.) When an ultraviolet light sterilizer so supports two separate flow paths it is called a "dual pass ultraviolet light sterilizer". Usually such a dual pass ultraviolet sterilizer contains but a single ultraviolet light source, making it only slight more expensive than a single path unit. Although such a flow path, and such a dual-path sterilizer, is not included within the preferred embodiment of the reverse osmosis unit 1 of the present invention essentially for being unnecessary, it will be understood that an ultraviolet sterilizer may be used in the flow path of the output purified water as well as the inlet unpurified water. In such a use in the flow path of the purified water, an ultraviolet sterilizer will serve to kill any microbiological organisms that may have contaminated the purified water while it was stored in the storage bag reservoir 16.

In the preferred embodiment of the reverse osmosis unit 1 shown in FIG. 3, the purified water that is pressurized by the pump 17 next flows through a directional check valve 18. The directional check valve 18 serves to ensure that the flow of purified water should be limited to be in only one direction, towards the outlet port 103 and the spigot 21.

A pressure switch 19 is located in the flow of purified water between the pump 17 and the outlet port 103. The pressure switch 19 senses the pressure in the flow of purified water at this location, and reports the sensed condition via an electrical signal to the control circuit 130. The sensed pressure will normally be about ten pounds per square inch (10 PSI) under force of pump 17 when the spigot 21 is closed. When the spigot 21 is open then only atmospheric pressure (or a slightly greater pressure depending on any pressure drop occurring in the spigot 21 and the flow lines leading to the spigot 21) will be sensed by pressure switch 19.

The purified water is finally dispensed, under pressure, from outlet port 103. The outlet port 103 is typically connected to the spigot 21. The spigot 21 is normally a manually operated handle valve dispensing fluid downwards through a nozzle. The spigot 21 is typically mounted sufficiently high upon the housing 10 (reference FIG. 1), and extends sufficiently far from the housing 10, so that its nozzle may flow fluid directly into the open tops of standard household containers, such as gallon jars and pitchers, that are set upon the same counter top surface as, and along side, the reverse osmosis unit 1.

The housing 10 has and presents one electrical connection, normally a standard a.c. line cord 122 that connects by plugging of its terminal plug 123 to 110 v.a.c. line power. The 110 v.a.c.—or, optionally by proper connection, 220 v.a.c. or other v.a.c. input power—is transformed by transformer 121 to 18 v.a.c. The 18 v.a.c. is routed to the control circuit 12 where it is further converted in a power supply 124 (shown in FIG. 4) to 24 v.d.c.

3. Electrical Circuit of the Preferred Embodiment of A Reverse Osmosis Unit in Accordance With the Present Invention An electrical schematic diagram of the control circuit 22 of the preferred embodiment of a counter top reverse osmosis unit 1 in accordance with the present invention is shown in FIG. 4.

The control circuit 22 is enclosed by a dashed line. As may immediately be observed, the control circuit 22 does not, in of itself, offer much "control", nor is it much of a "circuit", consisting as is does of only the three LED indicator lights 221–223 and associated current-limiting resistors 225–227. The "control" of the reverse osmosis system 1 is really accomplished by the manner by which a source of electrical power is selectively connected to the several sinks of electrical power through, and under the control of, switches. It is, however, useful to maintain the concept of a "control circuit" which term may mean either the limited components enclosed by the dashed line or that total assemblage of interconnected electrical components by which the entire function of the reverse osmosis unit 1 is controlled, depending upon context.

Continuing in the schematic diagram of FIG. 4, it may immediately be seen that the major electrical components with which the (proper) control circuit 22 communicates are (i) the power supply 124 (and through it the terminal plug 123 and line cord 122) for the receipt of 24 v.d.c. power, (ii) the inlet solenoid water valve 11 for purpose of energizing the inlet water solenoid coil 11 (partial), and (iii) the storage water upper level switch 23 for purpose of recognizing when the water storage bag 16 (shown in FIGS. 1 and 3) is full. The control circuit 22 is connected in electrical parallel across the power supply 124 with each of (i) the ultraviolet light sterilizer 13, and (ii) the series-connected storage water lower level control switch 24, pressure switch 19 and pump 17.

To a practitioner of the electrical circuit design arts FIG. 4 is self-explanatory. Supply grid electrical power received at, nominally, 110 v.a.c. (or other v.a.c.) via terminal plug 123 and line cord 122 is transformed in transformer 121 to 18 v.a.c. power. The 18 v.a.c. power is fused by fuse 1241 of nominal value 2.5 amperes, rectified in the diode bridge rectifier 1242, filtered by capacitors 1243 and 1244 respectively of nominal values 0.1 farad and 1000 microfarads, and clamped by zener diode 1245 type 1N4148 to produce 24 v.d.c. power, all within power supply 124. This 24 v.d.c. power is passed by the optional switch 127 in its normal position as illustrated in FIG. 4 to power the rest of the reverse osmosis unit 1.

The 24 v.d.c. electrical power may alternatively, optionally, be developed by a battery or batteries 124, and/or a solar array or like generator (such as a human- or water-powered generator) 126 (both shown in phantom line for being optional). The particular benefit derived from being able to optionally operate the counter top reverse osmosis unit 1 in accordance with the present invention from sources of power other than an a.c. power grid will be further discussed in following section 5. In the case that the 24 v.d.c. power is developed by other than power supply 124 then the switch 127 is present, and is placed in its position opposite to the position illustrated in FIG. 4 in order to power the rest of the reverse osmosis unit 1 from the optional energy sources 125, 126.

The 24 v.d.c. power is supplied to the ballast 132, and through it to the ultraviolet light source, or "germ tube", 131 of the ultraviolet light sterilizer 13 (shown in FIGS. 2 and 3).

An electrical path through series-connected resistor 227 of nominal value 1K ohms and light-emitting diode (LED) 221 causes a power on, or PWR ON, visual light indication during all times that the reverse osmosis unit 1 is energized. The electrically energization of LED 221 provides a visual signal observable to the exterior of the housing 10 (shown in FIGS. 1 and 2) to the effect that the reverse osmosis unit 1 is on.

The position 1 condition (opposite to the condition shown in FIG. 4) of the storage water upper level switch 23—occurring when the water storage bag 16 (shown in FIGS. 1 and 3) is full—enables a circuit path through the series-connected resistor 225 of nominal value 1K ohms and the light-emitting diode (LED) 223, providing a visual indication of the "FULL" water level sensed by this upper level switch 23. Energization of the LED 223 indicates that the water storage bag 16 (shown in FIGS. 1 and 3) is "FULL".

The position 2 condition (that condition illustrated in FIG. 4) of the storage water upper level switch 23—occurring during all times when the water storage bag 16 (shown in FIGS. 1 and 3) is not full—enables a circuit path through both the electrical parallel connection of (i) series-connected resistor 226 of nominal value 1K ohms and light-emitting diode (LED) 222, and also (iii) the solenoid coil 11 (partial) (part of inlet solenoid water valve 11 shown in FIGS. 1 and 3). Actuation of the upper level switch 23 to its position 2 energizes both (i) the inlet solenoid water valve 11 (shown in FIGS. 1 and 3) and (ii) the LED 222, respectively (i) opening the solenoid water valve 11 so as to permit inlet water to fill the reverse osmosis unit 1, and (ii) providing a visual indication of such a "FILL" operation.

Finally, assumption of the 2 position (opposite to the position shown in FIG. 4) by the water storage lower level switch 24, in conjunction with closure of the pressure switch 19, completes an electrical path through pump 17. The pressure switch 19 will only close when their is pressurized purified water available for dispensing, and the water storage lower level switch 24 will only assume its 2 position when the water stored in water storage bag reservoir 16 (shown in FIGS. 1–3) is greater than minimum. By this operation the counter top reverse osmosis unit is prevented from draining itself dry of purified water, requiring a repeat of the initialization sequence. The selective energizing of pump 17 is, or course, for the dispensing of purified water through the outlet port 103 and the spigot 21 (both shown in FIG. 3) under pressure.

4. Operation of the Preferred Embodiment of A Reverse Osmosis Unit in Accordance With the Present Invention From the explanation of the electrical schematic diagram of the preferred embodiment of a counter top reverse osmosis unit 1 shown in FIG. 4 just rendered in the preceding section 3, the operation of the unit 1 is straightforward.

When the unit is first plugged in to an a.c. power source the transformer 121 produces 18 v.a.c. and the power supply 124 produces 24 v.d.c. The "ON" indicator light, or LED, 221, lights; the "FILL" indicator light, or LED, 223 lights; the solenoid 11 opens so that water flow to the filters 11 and 12 begins (all shown in FIGS. 1–3); and the "germ tube" 131 of the optional UV sterilizer 13 turns on.

In accordance with the lack of any pump for increasing the pressure of the inlet water, the initial start-up sequence of the reverse osmosis system in accordance with the present invention is considerably different from previous reverse osmosis (RO) systems. As purified water fills the storage bag reservoir 16 (shown in FIGS. 1 and 3), the water storage lower level switch 24 will close (to the 2, or closed, position), completing the circuit to the pump 17 and causing an attempt to evacuate purified water (of which there may initially be little or none) through the spigot 21 (shown in FIGS. 1–3). The spigot 21 must be opened by a human user/maintainer to release air pressure until water flows, at which time the spigot 21 is closed. The pump 17 continues to run until pressure builds up between itself and the spigot 21 (reference the flow diagram of FIG. 3). Eventually the in-line water pressure switch 19 will sense a pressure of purified water and will open, thus breaking the electrical circuit path to pump 17 and stopping the pump 17.

After initial start-up, the pump 17 will deliver pressurized water whenever spigot 21 is depressed. When water is so dispensed the pressure on pressure switch 19 will be released, thereby completing an electrical circuit to the pump 17 for so long as the storage water lower level switch 24 remains closed. If the water is evacuated to the lower level, pumping will cease until the purified water is replenished. Note that, because the purified water is not completely evacuated, the start-up initialization sequence need not be again performed.

When, and if, the bag water storage reservoir becomes full then the "FILL" indicator light, or LED, 222 goes "off", the "FULL" indicator light, or LED, 223 goes "on"; the solenoid valve 11 closes, shutting of the flow of inlet water to the system 1; and the germ tube 131 of optional ultraviolet sterilizer 13 stays "on".

When the spigot 21 (shown in FIGS. 1–3) is depressed, meaning opened, then the pressure switch 19 immediately senses the immediate pressure drop between the spigot 21 and the storage bag reservoir 16, causing the pump 17 to actuate and water to flow. There may optionally be a pump safety cutoff, or overload, switch on the pump itself depending upon the type of pump used. This switch must also be closed, if necessary by a manual reset, in order to permit the pump 17 to run.

During the continuing evacuation of purified water through the spigot 21 a drop in the water level in the water storage bag reservoir 16, normally in the amount of approximately two to three ounces (2–3 oz.) will cause the water storage upper level switch 23 to close, in turn opening the solenoid valve 11 and causing a change from the "on" condition of the "FULL" indicator light 223 to the "on" condition of the "FILL" indicator light 222.

When, due to a continuing evacuation of purified water through the spigot 21, the water storage bag reservoir 16 is almost empty, a continuing attempt to draw water will cause the water storage lower level switch 24 to open, shutting off the pump 17 and stopping the flow of purified water. At this time the "PWR ON" indicator light 221 will still be "on", and the "FILL" indicator light 222 will also remain "on", informing the user/maintainer that no failure of the system 1 has occurred. The pump 17 will not run again until the water level in the water storage bag reservoir 16 rises sufficiently so as to close the water storage lower level switch 24.

5. A Reverse Osmosis Unit of the Present Invention May Operate Without Electricity As previously noted, the water storage bag reservoir 16 filled with purified water may be manually disconnected, and withdrawn, from the reverse osmosis unit 1. Although this is not the normal manner of dispensing purified water, it may be noted that this retrieval of purified water obviates any necessity for the pump 17. As a consequence of its low pressure membrane 15 the reverse osmosis unit 1 in accordance with the present invention is fully capable of providing purified water, by the bagful, totally without the use of any pump, nor of the electrical energy normally supplied to an electric pump.

If there is no electrical energy available then the inlet solenoid valve 11 may be removed by hand, permitting the water storage bag reservoir 16 to fill. If there is no electrical energy available then the control circuit 22 is inoperative not only to turn on the inlet solenoid valve 11, but also to turn it off when the water storage bag reservoir 16 fills to such an extent that further filling might hazard the occurrence of an undesirable back pressure across the osmotic membrane 15. Care must be taken that such a back pressure is not developed across the osmotic membrane 15 by virtue of its connection to a full, and sealed, water storage bag reservoir 16. It is, of course, possible to prevent such a back pressure from occurring simply by disconnecting the water storage bag reservoir 16, and by collecting the purified water in another container, such as a pot or pan, that is open to atmospheric pressure. It is preferred, however, to continue to use the water storage bag reservoir 16 both because it is meant to hold purified water, and it is selectively detachable from the reverse osmosis unit 1 so as to be drained of its contents. A detached water storage bag reservoir 16 may be, if necessary, safely transported to a location where purified water is required. Accordingly, it is necessary that, for fail-safe operation in the absence of electrical power, the water storage bag reservoir 16 should be vented to the atmosphere. So vented to atmosphere, the purified water storage bag reservoir 16 is incapable of developing a back pressure across the osmotic membrane 15. The venting to atmosphere is accomplished by selectively disconnecting the side of the "T" connector 161 leading to the pump 17, or by disconnecting the purified water feed line at the pump 17 itself.

The procedures for the operation of the unit 1 after an earthquake or other natural disaster when power may not be available for protracted periods but when purified water may be urgently needed due to contaminated water supplies and the like is somewhat intricate. First, if an inlet source of water pressurized to more than 10 PSI is not available then water at atmospheric pressure may be elevated to a height of 20 feet or more above the unit 1, or the approximate height of a 2–3 story building, and feed to the unit 1 through a line connected to its inlet port 101. The head of pressure developed will equal approximately 10 PSI, and permit the unit 1 to function.

The requisite 10+ PSI pressure for operation of the low pressure osmotic membrane 15 may alternatively be developed in, and by, a small solar-, or battery-, powered water pump.

Additionally, any of the counter top reverse osmosis unit 1, limited parts of the reverse osmosis unit 1 particularly including its ultraviolet sterilizer 13, and any optional water pump for feeding pressurized water to the reverse osmosis unit 1 may, in the event of an emergency and/or power emergency, typically be powered from two, series-connected, automotive car batteries (shown as battery 125 in FIG. 4). If necessary, the owner/user of the reverse osmosis unit 1 may be instructed to disconnect, or to cut, the connection of the step-down transformer 121 to the counter top reverse osmosis unit 1, and to connect, in lieu of a.c., a d.c. source of power.

Regardless of the emergency power environment, the input solenoid valve 11 must be opened, or disconnected, or bypassed, so that the inlet water may reliably reach the osmotic membrane 15. If necessary the input solenoid valve 11 must be manually so opened, or disconnected, or bypassed. The filters 12 and 14, and the optional ultraviolet sterilizer 13, are permissively, and normally, left connected in-line the flow of unpurified water even if, in the case of the sterilizer 13, they are un-powered. The filters will still work but the un-powered ultraviolet sterilizer 13 is, of course, inoperative without power for sterilizing the received inlet water. Chemicals may be added to the inlet water to kill biological agents if desired.

In the absence of electrical power the water purified by the reverse osmosis unit 1 cannot be, and is not, dispensed under any significant pressure from the spigot 21. The purified water is instead poured from the water storage bag reservoir 16, or other atmospheric pressure container, in which it is accumulated. The use of the reverse osmosis system 1 of the present invention in a mode independent of any electricity supply from a power grid is particularly beneficial for obtaining purified water after earthquakes or other natural disasters.

In accordance with the preceding discussion, still further adaptations and embodiments of the present invention will suggest themselves to a practitioner of the water purification arts. For example, the entire reverse osmosis unit 1 could be equipped with quick disconnect fittings, switch valves, and the like so as to permit its motor to be selectively re-plumbed so as to pressurize inlet water. The unit 1 might be electrically wired, and connected so as to be powered from an (external) solar array or photovoltaic power source, or from batteries, in the event of loss of a.c. power during a power emergency.

For example, a compact reverse osmosis unit in accordance with the present invention is not limited to being packaged as a freestanding counter top unit but could, instead, be alternatively packaged as, for example, a freestanding of wall-mounted drinking fountain.

Although the reverse osmosis system of the present invention does not require a booster pump on the inlet water at supply pressures as low as 10 PSI, the use of a booster pump on the inlet water supply is not precluded. The boost in pressure provided by such a pump will cause purified water to be produced more quickly by the osmotic membrane. This quicker production may be especially important when demand for purified water is high, as in the application of the present invention in drinking fountains.

Accordingly, the present invention should be interpreted broadly, and in accordance with the following claims only, and not solely in accordance with that particular embodiment within which the invention has been taught.

What is claimed is:

1. A counter top reverse osmosis unit configured and arranged for use in a fluid flow path between and among
    an inlet source of pressurized water,
    an outlet drain for accepting at atmospheric pressure waste water produced by the reverse osmosis unit, and
    an outlet port for dispensing of pressurized purified water produced by the reverse osmosis unit, the counter top reverse osmosis unit comprising;
    a housing in the form of a hollow body suitably sized so as to sit upon a counter top without toppling and suitably shaped so as to sit upon a level surface of the counter top without sliding or tilting, the housing presenting and permitting flow connections to each of the inlet source, the outlet drain and the outlet port, the housing in the form of a hollow body having and defining
    a first compartment.
    a second compartment, and
    a partition separating the first compartment from the second compartment;
    a filter means, located within the housing's first compartment and flow-connected through the housing to the inlet source of pressurized water, for filtering the pressurized water to produce filtered pressurized water;
    an ultraviolet light means, located within the housing's first compartment and flow-connected to the filter means, for sterilizing with ultraviolet light radiation the filtered pressurized water received from the filter means to produce pressurized sterilized filtered water;
    an osmotic membrane means, located within the housing's first compartment and flow-connected to the ultraviolet light means, for separating pressurized sterilized filtered water received from the ultraviolet light means into (i) waste water that is pressurized to a waste-water pressure that is sufficiently higher than atmospheric pressure so as to be suitable to expel the waste water into an environment that is at atmospheric pressure, and (ii) purified water that is pressurized to a purified-water pressure that is also higher than atmospheric pressure but that is not sufficiently higher so as to permit reliable dispensing of the purified water directly into the environment that is at atmospheric pressure;
    conduit means, located within the housing's first compartment and flow-connected to the osmotic membrane means for receipt of the waste water therefrom, for flow conducting the waste water that is pressurized to the waste-water pressure that is higher than atmospheric pressure through the housing to the outlet drain that is at atmospheric pressure;
    a collapsible storage bag reservoir means, located within the housing's second compartment and flow-connected to the osmotic membrane means for receipt of the purified water therefrom, for receiving and for storing the purified water; and
    a pump means, located within the housing's second compartment and flow connected to the collapsible storage bag reservoir means, for pumping under pressure purified water received from the collapsible storage bag reservoir means out the outlet port under an enhanced purified-water pressure that is adequate for the dispensing of the purified water into the environment that is at atmospheric pressure;

wherein the filter means, the ultraviolet light means, the osmotic membrane means, and the conduit means are located in the housing's first compartment, whereas the collapsible storage bag reservoir means and the pump means are located within the housing's second compartment;

wherein the pump means is flow-connected in line to a flow of purified water between the osmotic membrane means and the environment that is at atmospheric pressure.

2. The counter top reverse osmosis unit according to claim 1 further comprising:

an electrical switch located between the interior of the second compartment of the housing and the collapsible bag storage reservoir means contained therein for producing an electrical signal in response to a sensed fill level of the collapsible bag storage reservoir means.

3. The counter top reverse osmosis unit according to claim 2 further comprising:

an electrical means responsive to the electrical signal from the electrical switch for controlling the pump means.

4. The counter top reverse osmosis unit according to claim 3 wherein the electrical means is located within the first compartment of the housing, wherein the electrical means is accordingly located in a different compartment from both the electrical switch from which the electrical means receives the electrical signal, and also from the pump means that the electrical means serves to control, which electrical switch and pump means are both located within the second compartment of the housing.

5. The counter top reverse osmosis unit according to claim 2 further comprising:

an electric valve controllable for gating the flow of water from the inlet source of pressurized water to the filter means; and electrical means responsive to the electrical signal for controlling the electric valve.

6. The counter top reverse osmosis unit according to claim 5 wherein the electric valve is located within the second compartment of the housing; and wherein the electrical means is located within the housing's first compartment is accordingly located in a different compartment from both the electrical switch from which the electrical means receives the electrical signal, and also from the electric valve that the electrical means serves to control, which electrical switch and electric valve are both located within the housing's second compartment.

7. A reverse osmosis unit comprising:

a filter flow-connected to an external source of pressurized unpurified water for filtering the unpurified water;

an ultraviolet light flow-connected to the filter for sterilizing filtered unpurified water received from the filter;

an osmotic membrane means flow-connected to the ultraviolet light for separating sterilized filtered unpurified water received from the ultraviolet light into (i) waste water that is flow-conducted to an external drain, and (ii) purified water;

a collapsible bag storage reservoir flow-connected to the osmotic membrane for storing purified water received therefrom;

a pump flow-connected to the collapsible bag storage reservoir for pumping under pressure purified water received therefrom;

a conduit flow-connected to the pump for flow-conducting purified water under pressure of the pump to an outlet port;

an electrical switch for producing an electrical signal in response to a sensed fill level of the collapsible bag storage reservoir;

a first electrical control means responsive to the electrical signal for controlling the pump;

an electric valve controllable for gating the flow of water from the external source of pressurized water to the filter;

a second electrical control means responsive to the electrical signal for controlling the electric valve; and a housing including a hollow body suitably sized and shaped to sit upon a counter top level surface, the housing presenting and permitting flow connections to each of the external source of unpurified water, the external drain and the outlet port, the hollow body having and defining a first compartment containing the filter and the osmotic membrane means, a second compartment containing the collapsible bag storage reservoir and the pump, and a partition separating the first compartment from the second compartment within the hollow body, therein to separate, on the one hand, the filter and the osmotic membrane means from, on the other hand, the collapsible bag storage reservoir and the pump.

8. The reverse osmosis unit according to claim 7 wherein the first compartment of the hollow body of the housing further contains the ultraviolet light, the conduit, the first electrical control means and the second electrical control means; and wherein the second compartment of the hollow body of the housing further contains the electrical switch and the electric valve.

9. The reverse osmosis unit according to claim 7 wherein the hollow body of the housing is in the shape of a cylindrical section.

10. The reverse osmosis unit according to claim 9 wherein the partition of the hollow body of the housing is substantially vertical within the hollow body in the shape of a cylindrical section, dividing the hollow body into the first and the second compartment that are each in the shape of a vertical one-half cylinder.

11. The reverse osmosis unit according to claim 7 further comprising:

a dispensing mechanism mounted to the exterior of the hollow body of the housing and flow connected to the conduit for gating the flow of pressurized purified water from the outlet port.

* * * * *